United States Patent [19]
Satran et al.

[11] Patent Number: 6,033,157
[45] Date of Patent: Mar. 7, 2000

[54] ADJUSTMENT MECHANISM

[75] Inventors: Amir Satran; Yaron Eisen, both of Kfar Vradim, Israel

[73] Assignee: Iscar Ltd., Tefen, Israel

[21] Appl. No.: 09/312,769

[22] Filed: May 17, 1999

[30] Foreign Application Priority Data

May 29, 1998 [IL] Israel .................................... 124697

[51] Int. Cl.$^7$ .................................................. B23C 5/24
[52] U.S. Cl. .............................. 407/37; 407/36; 407/44; 407/45
[58] Field of Search .................................. 407/35, 36, 37, 407/38, 45, 47, 58, 53; 408/181, 186, 197, 185, 146, 147

[56] References Cited

U.S. PATENT DOCUMENTS

| | | | |
|---|---|---|---|
| 4,229,128 | 10/1980 | Heisner | 407/37 |
| 4,606,108 | 8/1986 | Davis | 407/36 |
| 4,775,268 | 10/1988 | Michalon | 408/156 |
| 5,102,269 | 4/1992 | Arai et al. | 407/41 |
| 5,217,333 | 6/1993 | Hunt | 408/181 |
| 5,853,271 | 12/1998 | Schanz | 408/146 |
| 5,906,458 | 5/1999 | Planche | 408/197 |

*Primary Examiner*—Henry W. H. Tsai
*Attorney, Agent, or Firm*—Mark M. Friedman

[57] ABSTRACT

An adjustment mechanism for adjusting an insert pocket wall's abutment surface in order to alter the location of an insert mounted in the pocket. The adjustment mechanism includes an adjustment screw and adjustment ball located in an adjustment bore. The adjustment ball is located in the vicinity of the pocket wall and on tightening the adjustment screw the adjustment ball is forced against the pocket wall. The force applied by the adjustment ball deforms the pocket wall in the region of contact between the adjustment ball and the pocket wall resulting in the required adjustment of the abutment surface.

7 Claims, 5 Drawing Sheets

ADJUSTMENT MECHANISM

FIELD OF THE INVENTION

This invention relates to a mechanism for the adjustment of the location of an insert in an insert pocket.

BACKGROUND OF THE INVENTION

There are many machining operations involving cutting tools in which it is important to be able to precisely locate the cutting edges of cutting inserts mounted on the cutting tools. For inserts clamped in insert pockets formed in the cutting tool, the precise location of the cutting edge depends on the precision with which the inserts and pockets are manufactured. Imprecision in either of these two factors will result, amongst other things, in unevenly cut surfaces. For example, slotting cutters with radially directed inserts having insert pockets cut into opposite faces of the cutter body can suffer from both mismatch between right and left inserts and from radial and axial runout.

Inserts, and especially their cutting edges, can be ground in order to make all the inserts to be mounted on a cutting tool uniform. However, the tool pockets with two adjacent pocket walls cannot be ground and therefore there may be a certain amount of inaccuracy in the location of a mounted insert due, basically, to imprecision in the location of the pocket walls which abut the insert.

In view of the foregoing, it should be apparent that there exists a need to provide an adjustment mechanism that will eliminate, or reduce to within tolerable limits, imprecision in the location of the pocket walls which abut the insert, thereby reducing location inaccuracies of inserts mounted in the pockets.

SUMMARY OF THE INVENTION

It is the object of the present invention to provide a mechanism for adjusting a pocket's abutting features for altering the location of an insert mounted in an insert pocket.

In accordance with the present invention there is provided in a cutting tool an adjustment mechanism for an insert pocket comprising:

an adjustment bore having a rear portion and a forward portion, the forward portion being located in the vicinity of an insert pocket wall; and
  an adjustment member located in the rear portion of the adjustment bore, the adjustment member having a front end adjacent the forward portion of the adjustment bore, the arrangement being that on urging the adjustment member into the forward portion of the adjustment bore a force is applied to the insert pocket wall for altering, through deformation, the location of at least a portion thereof.

In accordance with a preferred embodiment of the invention, at least a portion of the rear portion of the adjustment bore is screw threaded and the adjustment member is an adjustment screw having a front end and a threaded rear end, the adjustment screw being in threaded engagement with the rear portion of the adjustment bore, and wherein the front end of the adjustment screw is urged towards the forward portion of the adjustment bore when the adjustment screw is tightened.

Further in accordance with a preferred embodiment of the invention, the adjustment mechanism further comprises an adjustment ball located in the forward portion of the adjustment bore adjacent the pocket wall, so that on tightening the adjustment screw the front end thereof engages and forces the adjustment ball into contact with the forward portion of the adjustment bore as a result of which the adjustment ball applies a force to the pocket wall for altering, through deformation, the location of at least a portion thereof.

Still further in accordance with a preferred embodiment of the invention, the adjustment ball is forced into contact with the forward portion of the adjustment bore at first and second regions of contact, whereby the first region of contact is deformed and consequently a rear abutment surface of the pocket is caused to bulge into the pocket.

Preferably, the forward portion of the adjustment bore is of a squashed frustoconical form.

Typically, the cross section of the forward portion of the adjustment bore taken in a transverse plane of the adjustment bore and passing through the first and second regions of contact is generally oval in shape.

Further typically, the cross section of the forward portion of the adjustment bore taken in a longitudinal plane of the adjustment bore and passing through the first and second regions of contact has a wedge-like shape.

If desired, the front end of the adjustment screw is provided with a conical recess.

BRIEF DESCRIPTION OF THE DRAWINGS

For a better understanding, the invention will now be described, by way of example only, with reference to the accompanying drawings in which.

DETAILED DESCRIPTION OF THE INVENTION

The invention will be described with respect to a slotting cutter, however it will be appreciated that it applies equally well to milling cutters in general and to other cutting tools of the kind having replaceable cutting inserts mounted in an insert retaining pocket.

Figure 1:
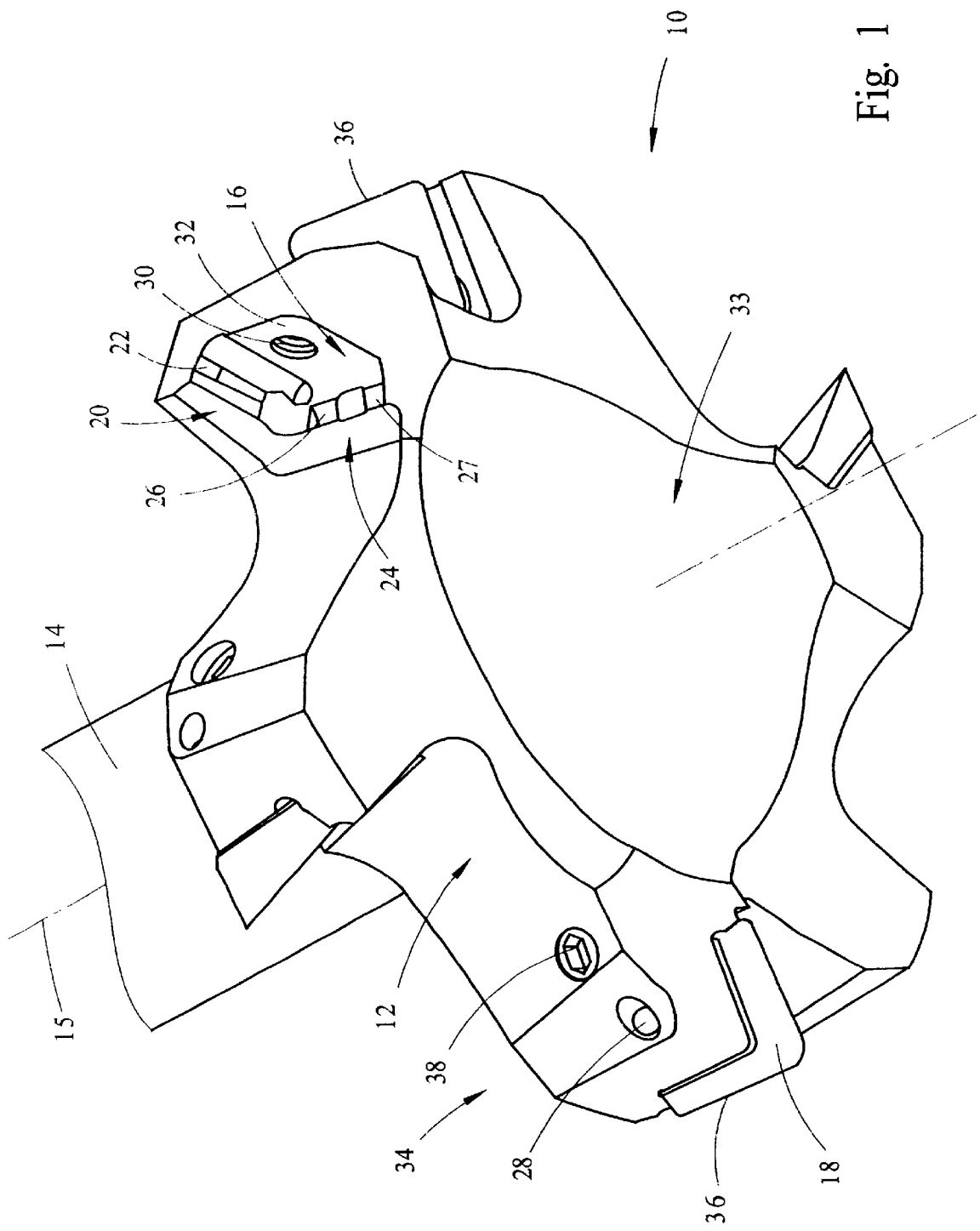
FIG. 1 is a perspective view of a slotting cutter with one cutting insert removed.
Figure 2:
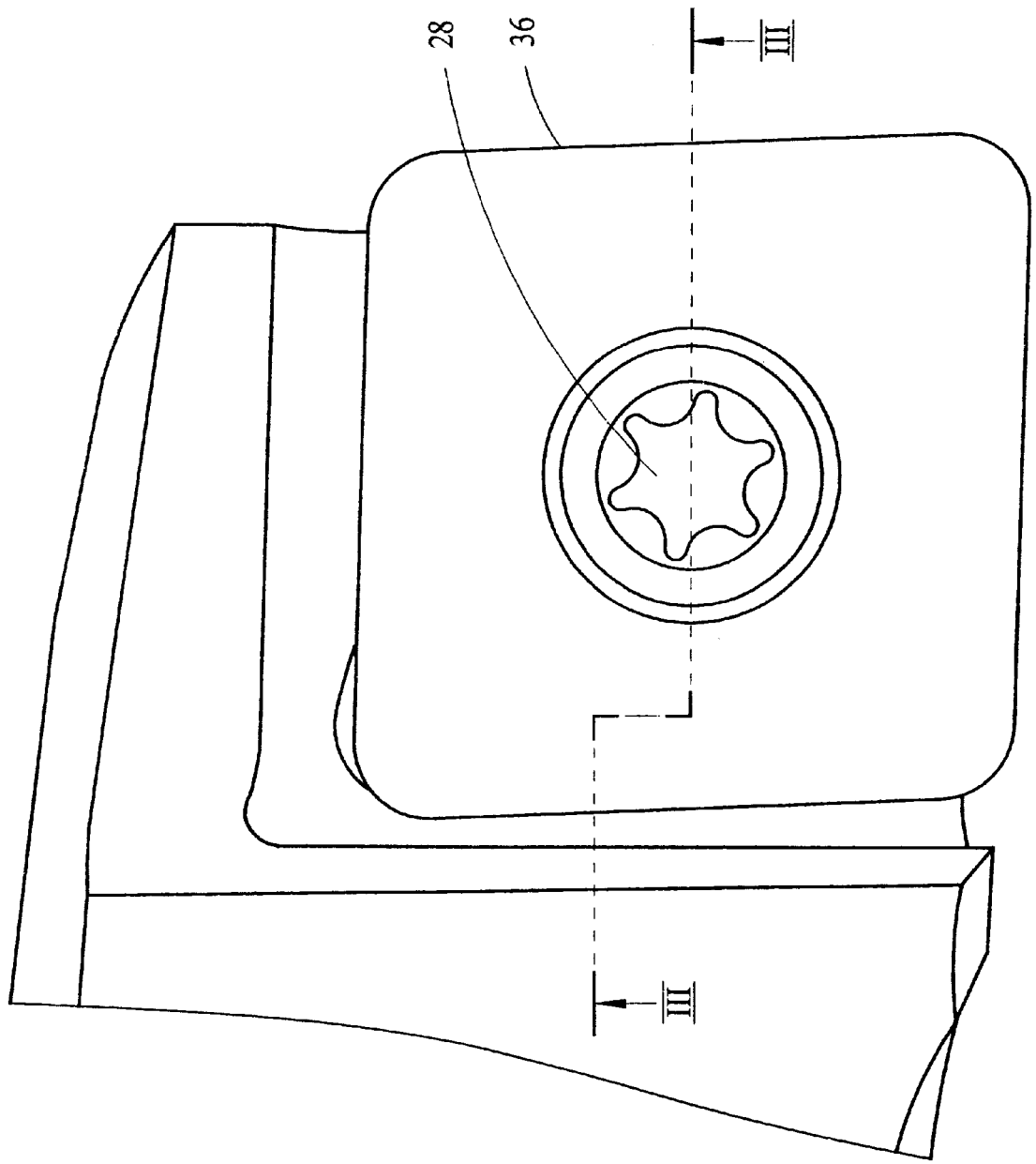
FIG. 2 is a top view of an insert located in an insert pocket of the slotting cutter shown in FIG. 1.

Attention is first drawn to FIGS. 1 and 2 showing a slotting cutter 10 comprising a tool body 12 driven by a shaft 14. The slotting cutter has an axis of rotation 15. The tool body 12 is provided with a plurality of cutting insert receiving pockets 16 for receiving cutting inserts 18. Each pocket 16 comprises a side wall 20 having a side abutment surface 22, and a rear wall 24 having an inner rear abutment surface 26 and an outer rear abutment surface 27. The insert 18 is secured to the pocket 16 by means of a clamping screw 28 which passes through a screw bore 29 (see FIG. 3) in the insert and is received in a threaded screw bore 30 formed in the base 32 of the pocket 16. The insert has four generally upright peripheral walls, 31a, 31b, 31c and 31d (see FIG. 4). One peripheral wall, 31a, of the insert 18 abuts the side abutment surface 22, whereas an adjacent peripheral wall, 31b, of the insert abuts the inner and outer rear abutment surfaces 26 and 27, respectively, thus determining the location of the insert 18 in the insert pocket 16.

In slotting cutters of the type shown, the inserts 18 are disposed alternately on the tool end face 33 and on the tool back face 34, defining "right" and "left" inserts, respectively. For precise machining of a workpiece it is important that the cutting edges 36 of all the inserts mounted on the tool be correctly aligned. Incorrectly aligned cutting edges can give rise to radial runout and/or mismatch between right and left inserts. Radial runout of a given insert refers to the situation whereby that insert is displaced radially outwards with respect to the other inserts, the displacement being given by a radial translation of the insert without rotation about its clamping screw. Mismatch between a right and left insert, refers to the situation whereby either one or both the inserts is rotated about its clamping screw as a consequence of which the inserts' cutting edges are rotationally displaced relative to each other. Hence, for precise machining, both radial runout and mismatch between right and left inserts should be eliminated, or reduced to a minimum.

Assuming that the inserts have been manufactured as precisely as possible, the present invention provides an adjustment mechanism for adjusting, by means of an adjustment screw 38, the location of a pocket's abutment surface. Preferably, as will be described in greater detail below, two adjustment screws are used. More specifically, for the slotting cutter shown in FIG. 1, the locations of pocket's rear abutment surfaces are adjusted so that mismatch between left and right inserts and radial runout can be eliminated or reduced to a required minimum by adjusting the adjustment screws.

Figure 3:
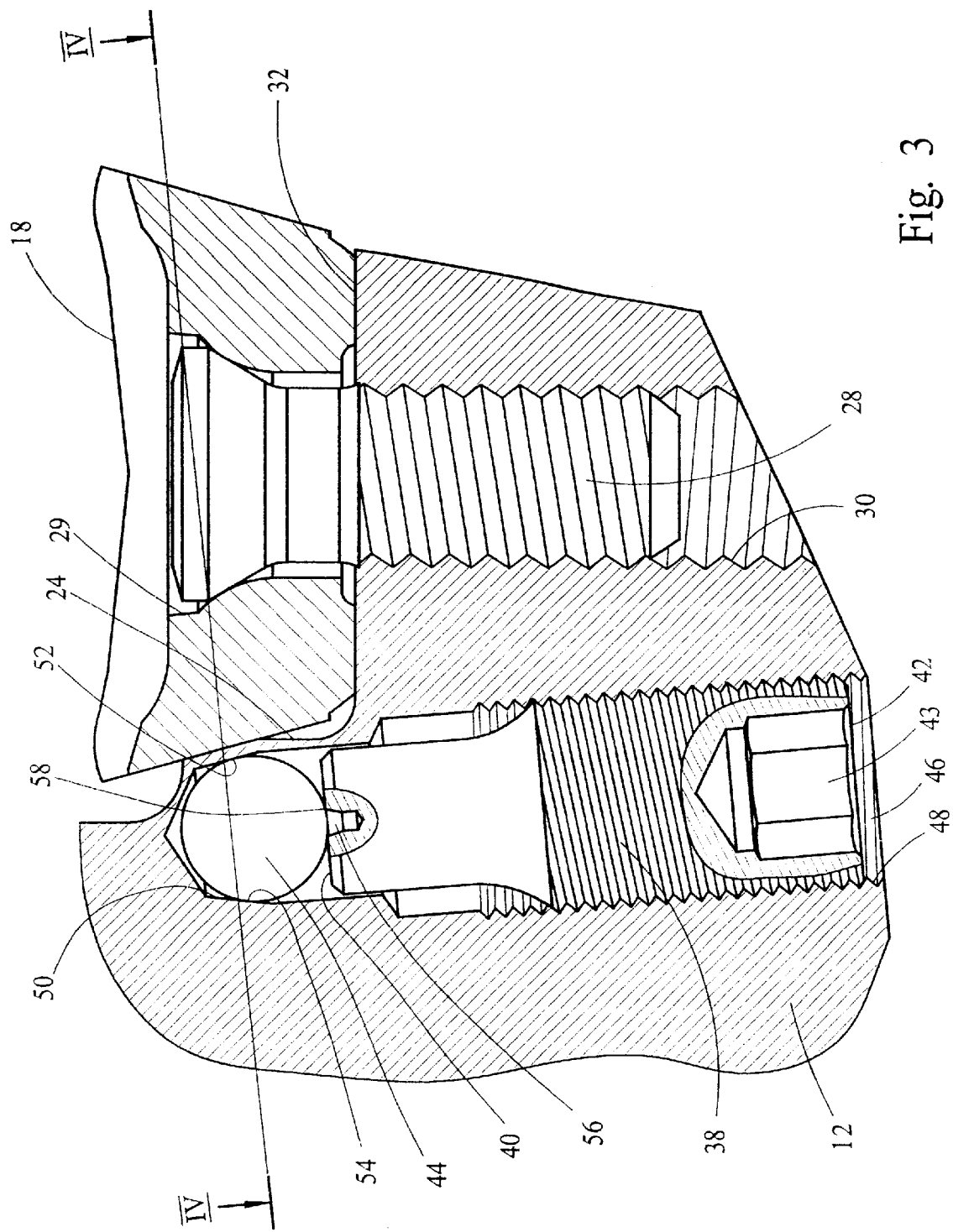
FIG. 3 is a cross-sectional view taken along the line III—III of FIG. 2.

With reference to FIG. 3, the adjustment screw 38 has a front end 40 and a rear end 42 provided with a socket 43, such as an hexagonal or spline socket or the like, for accepting a wrench in order to tighten or loosen the adjustment screw. An adjustment ball 44 is located close to, and is capable of being engaged by, the front end 40 of the adjustment screw 38. The adjustment screw and adjustment ball are located in an adjustment bore 46 provided in the tool body 12. The adjustment bore 46 has a rear portion 48, at least a portion of which is screw threaded, for engaging the adjustment screw 38, and a forward portion 50, at least partially conical in form, for engaging the adjustment ball 44. As will be described in greater detail below, the forward portion 50 is preferably of a squashed frustoconical form.

As the adjustment screw 38 is tightened it progresses into the adjustment bore 46 and forces the adjustment ball 44 into contact with the forward portion 50 of the adjustment bore. The adjustment screw applies a force on the adjustment ball which in turn applies a force on the forward portion 50 of the adjustment bore at a first region of contact 52 and a second region of contact 54. The front end 40 of the adjustment screw 38 is preferably provided with recess 56, which can be, for example, of a conical or spherical form. This ensures a larger contact region 58 between the adjustment screw and the adjustment ball as compared with the case in which the front end 40 is flat. For the case of a conically shaped recess, as shown in the figure, the contact region 58 is a circular rim, which is the base of the conical cut away region. When adjusting the location of the pocket walls in the vicinity of the first region of contact 52, by means of the adjustment screw 38, the clamping screw 28 is either loosened or completely removed.

Figure 4:
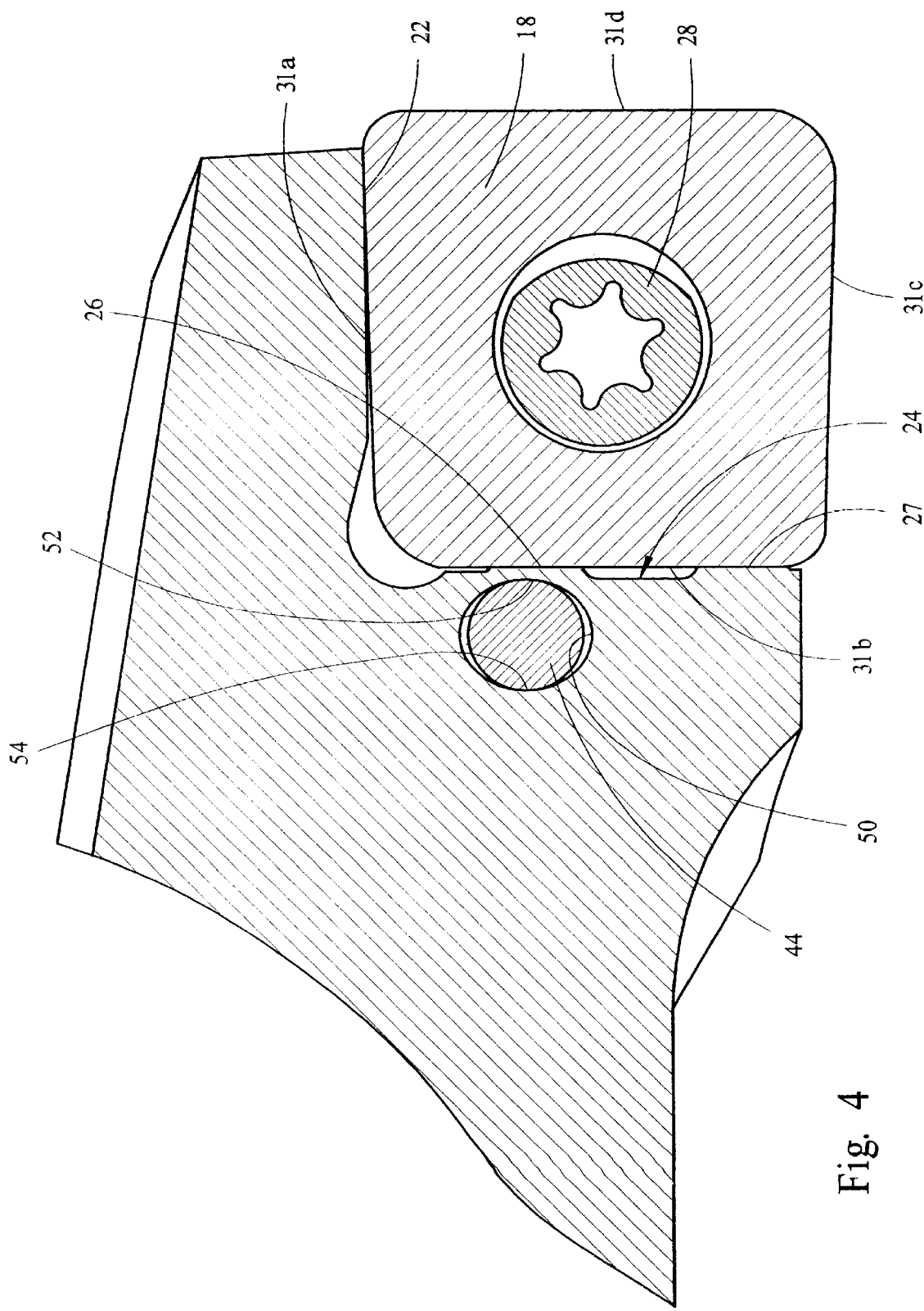
FIG. 4 is a cross-sectional view taken along the line IV—IV of FIG. 3.

Referring now to both FIGS. 3 and 4 it is noted that the cross section of the forward portion 50 of the adjustment bore is not symmetrical in shape. In fact, the forward portion 50 has a squashed frustoconical form. The cross section of the forward portion 50 shown in FIG. 3 is taken in a radial plane (i.e., in a plane perpendicular to the axis of rotation 15 of the slotting cutter, or, with respect to the adjustment bore 46, in a longitudinal plane of the adjustment bore passing through the first and second regions of contact 52 and 54, respectively.) and has, in this view, the shape of a frustum taken in an axial plane, that is in a plane including the axis of the frustoconical surface. Or, in other words, the cross section of the forward portion 50 taken in a longitudinal plane of the adjustment bore passing through the first and second regions of contact 52 and 54, respectively, has a wedge-like shape. The cross section of the forward portion 50 shown in FIG. 4 is taken in an axial plane (i.e., in a plane parallel to the axis of rotation 15 of the slotting cutter, or, with respect to the adjustment bore 46, in a transverse plane of the adjustment bore passing through the first and second regions of contact 52 and 54, respectively.) and, as can be seen, is substantially oval in shape in this view. This particular shape of the forward portion 50 of the adjustment bore ensures that adjustment ball 44 applies force to the forward portion 50 only at the first and second regions of contact 52 and 54, respectively, thereby concentrating the applied force at these regions. If, on the other hand, the forward portion 50 were to be of a regular frustoconical form, instead of a squashed frustoconical form, then the cross section shown in FIG. 4 would not be oval in shape but circular and the adjustment ball 44 would make contact with the forward portion of the adjustment bore at a continuous circular region instead of at the two distinct regions of contact 52 and 54. As a consequence of the oval shaped cross section of the forward portion 50, as shown in FIG. 3, the force applied by the adjustment ball on the forward portion 50 of the adjustment bore is generally in the radial direction.

As can be seen in FIGS. 3 and 4, the pocket rear wall 24 is relatively thin in the region adjacent the forward portion 50 of the adjustment bore 46. Therefore, the force applied by the adjustment ball 44 on the first region of contact 52 will deform the rear wall 24 of the pocket in the region of the inner rear abutment surface 26, causing the rear abutment surface 26 to bulge into the pocket. On the other hand, the second region of contact 54 at the forward portion 50 of the adjustment bore is supported by a relatively large voluminous region (to the left of the second region of contact 54 in FIG. 3) of the tool body 12. Therefore, the main effect of the force applied by the adjustment ball 44 on the second region of contact 54 will be only to cause a slight crushing of the tool body in the vicinity of the second region of contact 54.

In accordance with the present invention, the deformation of a pocket wall, following the tightening of the adjustment screw, is used in order to correct for imprecisions in the location of the pocket wall. More specifically, for the slotting cutter shown in the figures, the deformation of the pocket rear wall 24 in the region of the inner rear abutment surface 26, following the tightening of the adjustment screw 38, is used in order to eliminate mismatch between right and left inserts due to imprecise machining of the pocket rear wall 24, as will be described below.

In the figures, only one adjustment mechanism of the invention is shown. This being the case, any tightening of the screw will cause the inner rear abutment surface 26 to deform, bulging into the pocket thereby displacing the inner rear abutment surface primarily in an outward radial direction. Consequently, the insert 18 will be moved in the outward radial direction. However, for the insert to remain in contact with the side abutment surface 22 and the outer rear abutment surface 27 whilst being displaced at the inner rear abutment surface 26 in the radial direction, the insert will rotate in a clockwise direction (for the insert shown in FIG. 4) about the clamping screw 28. This type of adjustment can be used for correcting mismatch between right and left inserts of the cutting tool shown in FIG. 1, whereby the insert shown in FIG. 4 requires clockwise rotation about the clamping screw. In a specific non-binding example, the thickness of the pocket wall between the inner rear abutment surface 26 and the first region of contact 52 with the adjustment ball is approximately 0.34 mm. Generally, the deformation of the inner rear abutment surface will give rise to a displacement of a few hundredths of a millimeter, typically two hundredth's of a millimeter. Generally, the deformation is plastic, so that once the location of the insert has been adjusted by tightening the adjustment screw it is not possible to reverse the action by untightening the adjustment screw.

Figure 5:
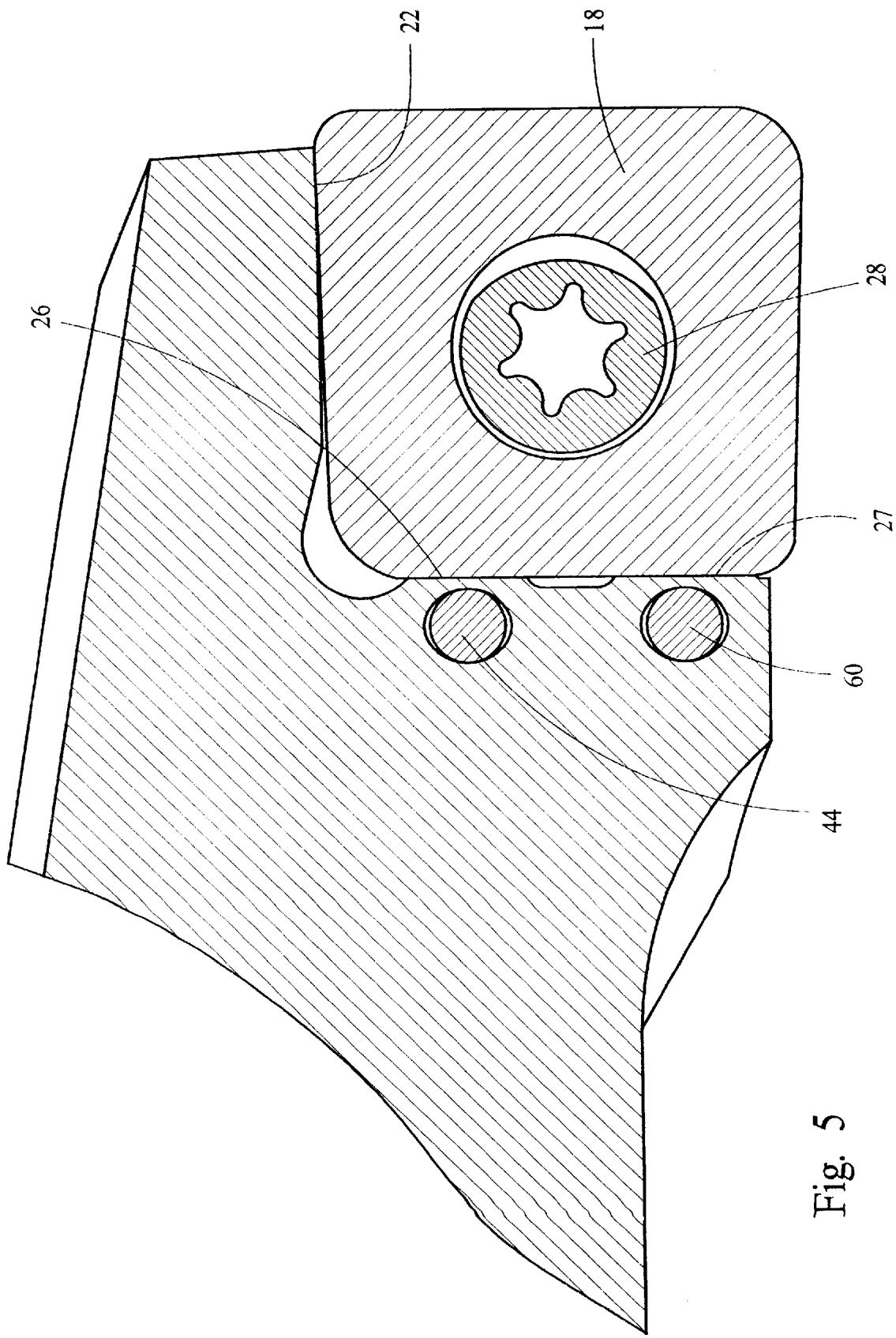
FIG. 5 is a cross-sectional view similar to that of FIG. 4, but for an insert pocket provided with two adjustment mechanisms.

For correcting radial runout of the inserts, or for correcting mismatch whereby the insert shown in FIG. 4 requires anti-clockwise rotation about the clamping screw, two adjustment mechanisms are required. Referring to FIG. 4 it is seen that the adjustment ball 44 is disposed in the vicinity of the inner rear abutment surface 26 of the rear wall 24. The adjustment screw 38 (not shown in FIG. 3) and the adjustment ball 44 constitute a first adjustment mechanism. It should be apparent that a second adjustment mechanism comprising a second adjustment screw (not shown in the figures) and an associated second adjustment ball can be provided in the vicinity of the outer rear abutment surface 27. FIG. 5 shows such a second adjustment ball 60 of a second adjustment mechanism. By tightening the adjustment screws of both the first and second adjustment mechanisms, both the inner rear abutment surface 26 and the outer rear abutment surface 27 will be deformed, each bulging into the pocket, thereby both the inner rear abutment surface 26 and the outer rear abutment surface 27 will be displaced in an outward radial direction. If both the inner rear abutment surface and the outer rear abutment surface are displaced in the outward radial direction by the same amount the insert 18 will be moved in the outward radial direction, whilst maintaining contact with all three abutment surfaces 22, 26, and 27, without rotation about the clamping screw 28.

It will be appreciated that a further third adjustment mechanism can be provided for axial adjustment of the insert. Referring to FIG. 5 the third adjustment mechanism would be positioned in such a manner that its associated adjustment ball would be located in the vicinity of side abutment surface 22.

It will be apparent that whereas the adjustment mechanism has been described using an adjustment screw and a separate adjustment ball, it is conceivable to use an adjustment screw only, with the front end 40 of the screw directly in contact with the forward portion 50 of the adjustment bore.

Although the present invention has been described to a certain degree of particularity, it should be understood that various alterations and modifications could be made without departing from the spirit or scope of the invention as hereinafter claimed. For example, it will be apparent that the forcing of the adjustment ball 44 into contact with the forward portion 50 of the adjustment bore does not necessarily have to be carried out by the adjustment screw 38. This action can be carried out by any suitable adjustment member that engages the adjustment ball at its forward end and that is driven to advance into the adjustment bore 46.

We claim:

1. In a cutting tool an insert pocket adjustment mechanism comprising:

an adjustment bore (46) having a rear portion (48) and a forward portion (50), the forward portion being located in the vicinity of an insert pocket wall (20, 24);

an adjustment member (38) located in the rear portion (48) of the adjustment bore (46), the adjustment member (38) having a front end (40) adjacent the forward portion (50) of the adjustment bore (46); and an adjustment ball (44) located in the forward portion (50) of the adjustment bore (46) adjacent the insert pocket wall (20, 24), the arrangement being so that on urging the adjustment member (38) into the forward portion (50) of the adjustment bore (46), the front end (40) of the adjustment member (38) engages and forces the adjustment ball (44) into contact with the forward portion (50) of the adjustment bore (46), as a result of which the adjustment ball (44) applies a force to the pocket wall (20, 24) for altering, through deformation, the location of at least a portion of the pocket wall (24).

2. The insert pocket adjustment mechanism according to claim 1, wherein at least a portion of the rear portion (48) of the adjustment bore (46) is screw treaded an the adjustment member (38) is an adjustment screw having a front end (40) and a threaded rear end (42), the adjustment screw (38) being in threaded engagement with the rear portion (48) of the adjustment bore (46), the arrangement being so that on tightening the adjustment screw the adjustment screw (38) is urged towards the forward portion of the adjustment bore and the front end (40) of the adjustment screw (38) engages and forces the adjustment ball (44) into contact with the forward portion (50) of the adjustment bore as a result of which the adjustment ball (44) applies a force to the pocket wall (20, 24) for altering, through deformation, the location of at least a portion of the pocket wall (24).

3. The insert pocket adjustment mechanism according to claim 2, wherein the adjustment ball (44) is forced into contact with the forward portion (50) of the adjustment bore (46) at first and second regions of contact (52, 54), whereby the first region of contact (52) is deformed and consequently at least a portion of a rear abutment surface (26, 27) of the pocket is caused to bulge into the pocket.

4. The insert pocket adjustment mechanism according to claim 1, wherein the forward portion (50) of the adjustment bore (46) is nonsymmetrical in form.

5. The insert pocket adjustment mechanism according to claim 4, wherein the cross section of the forward portion (50) of the adjustment bore taken in a transverse plane of the adjustment bore and passing through the first and second regions of contact is generally oval in shape.

6. The insert pocket adjustment mechanism according to claim 4, wherein the cross section of the forward portion of the adjustment bore taken in a longitudinal plane of the adjustment bore and passing through the first and second regions of contact has the shape of a frustum.

7. The insert pocket, adjustment mechanism according to claim 2, wherein the front end of the adjustment screw is provided with a conical recess.

\* \* \* \* \*